Oct. 13, 1964  S. YERKOVICH  3,153,145
X-RAY FILM CASSETTE
Filed Sept. 28, 1961  5 Sheets-Sheet 1
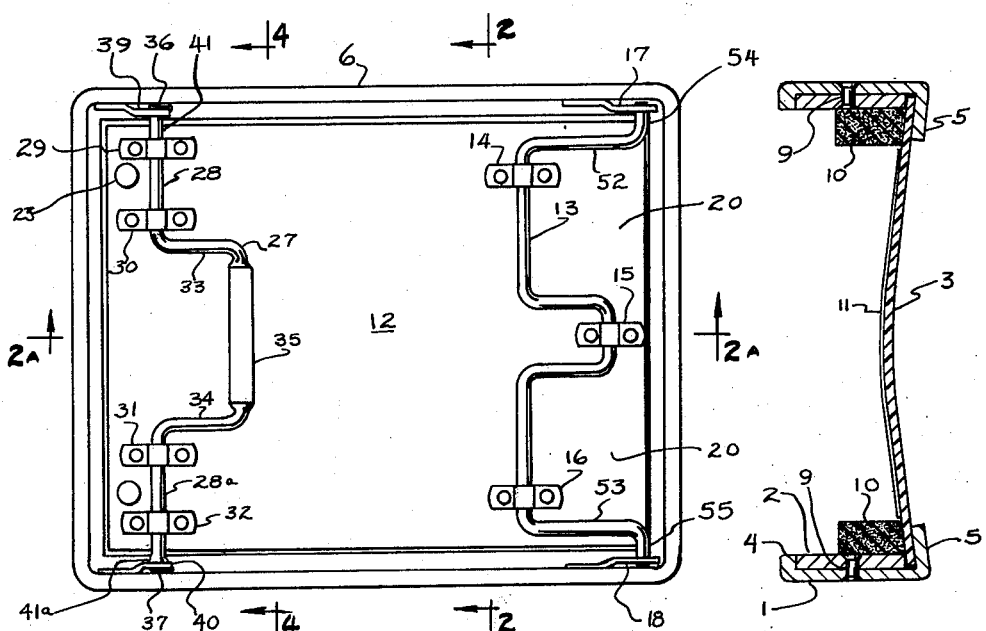
FIG. 1
FIG. 2
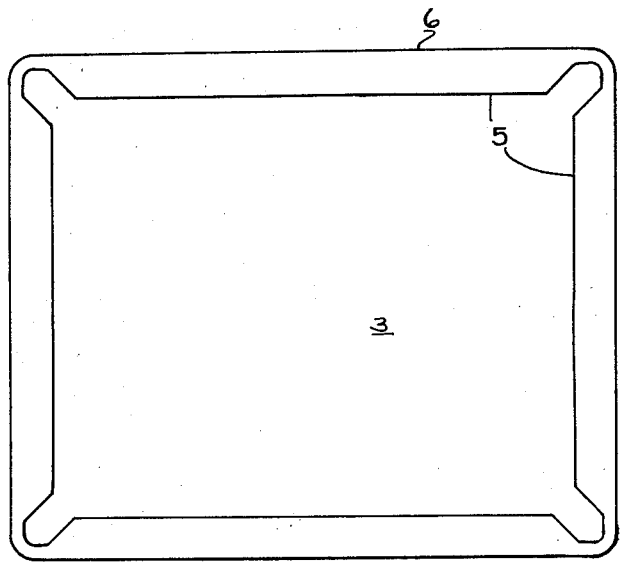
FIG. 3
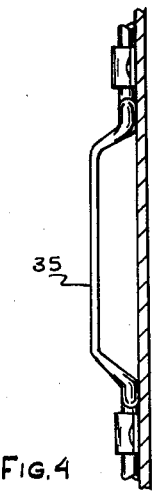
FIG. 4
INVENTOR.
SIMON YERKOVICH
BY
LeRoy J. Leishman

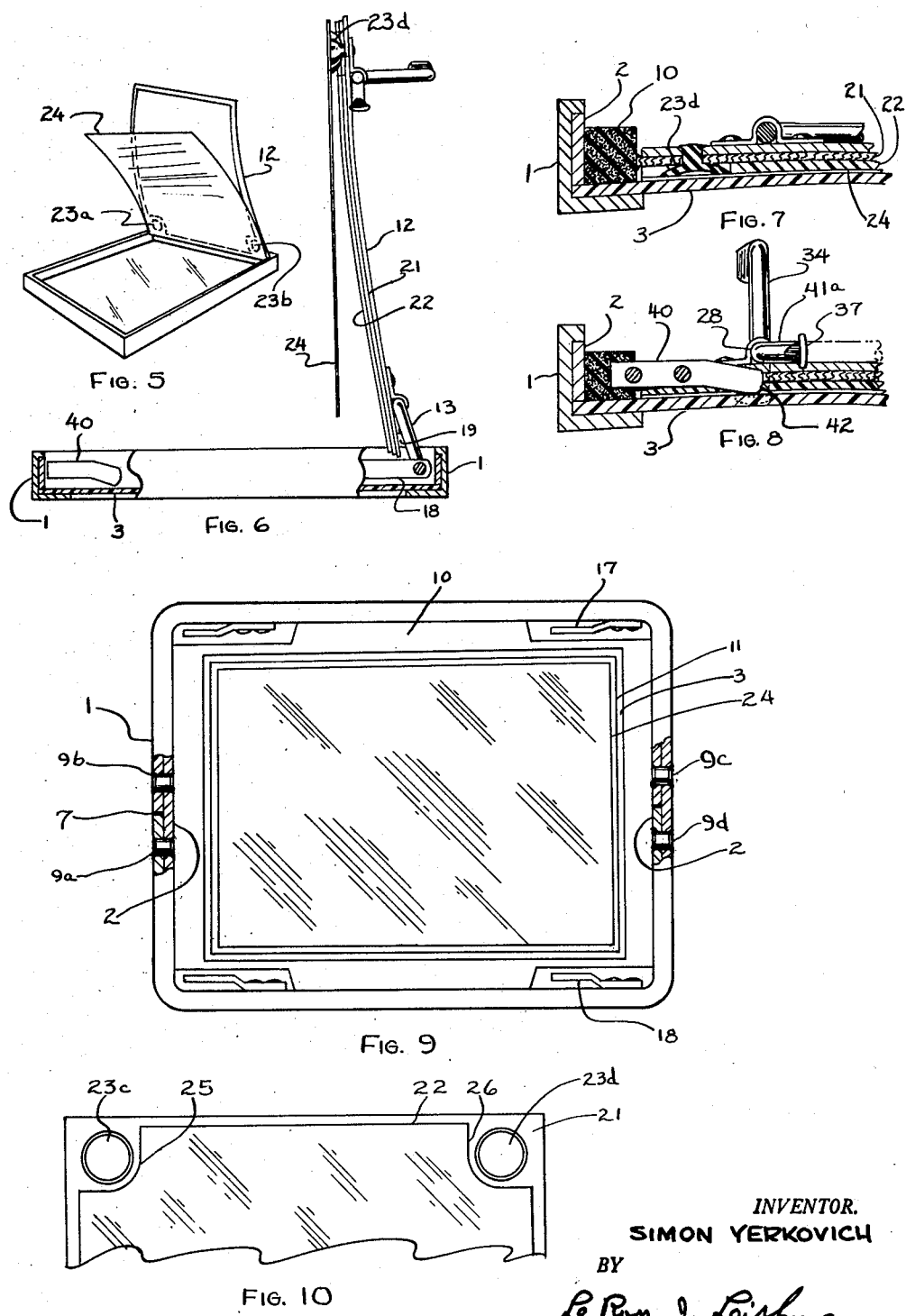

Oct. 13, 1964 S. YERKOVICH 3,153,145
X-RAY FILM CASSETTE
Filed Sept. 28, 1961 5 Sheets-Sheet 3

INVENTOR.
SIMON YERKOVICH
BY
Le Roy J. Reichman

Oct. 13, 1964 S. YERKOVICH 3,153,145
X-RAY FILM CASSETTE
Filed Sept. 28, 1961 5 Sheets-Sheet 4

INVENTOR.
SIMON YERKOVICH
BY
*LeRoy J. Leishman*

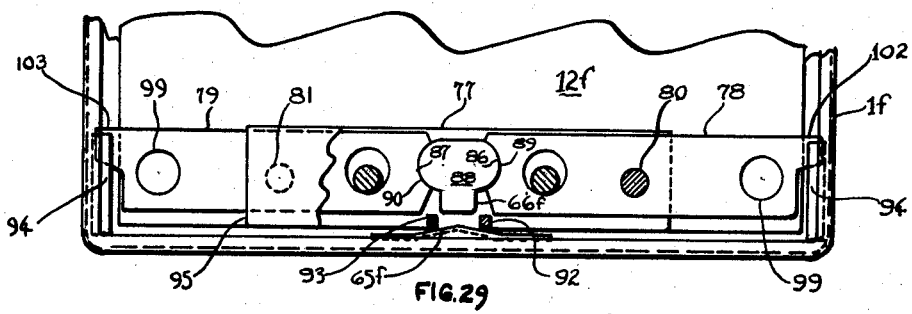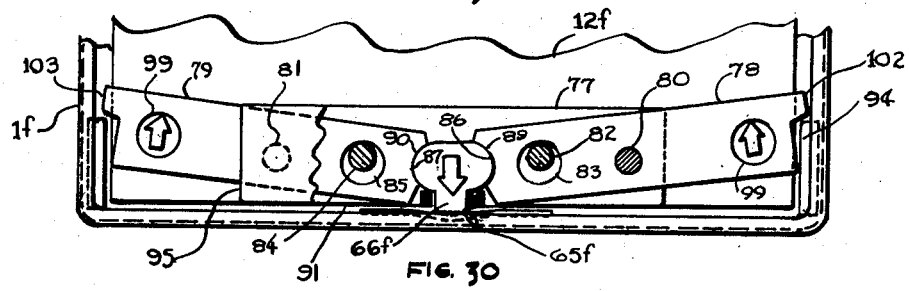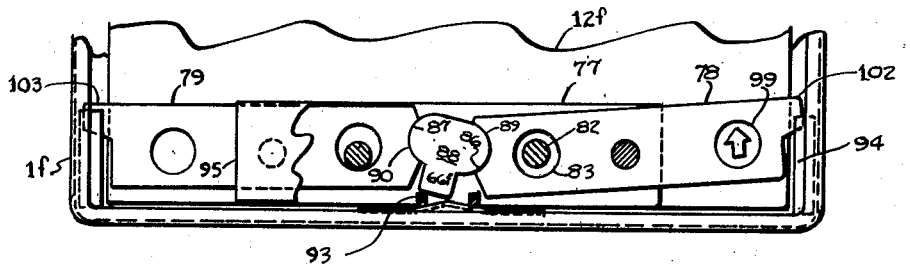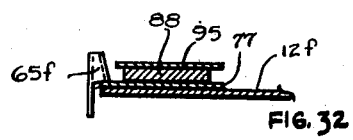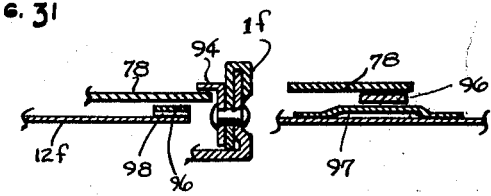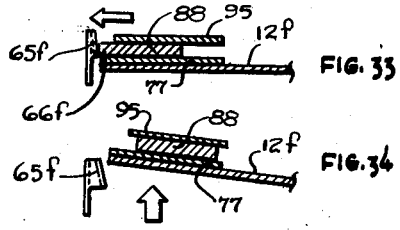

3,153,145
X-RAY FILM CASSETTE
Simon Yerkovich, 3971 East Blvd., Los Angeles, Calif.
Filed Sept. 28, 1961, Ser. No. 141,339
13 Claims. (Cl. 250—68)

The invention herein described pertains to X-ray cassettes, or light-tight holders for X-ray films, and more particularly to structural features of such devices.

As is well known, the films for X-ray pictures or radiographs are usually exposed to the X-rays in a lighted room. The X-ray film must accordingly be enclosed in a case which is opaque to visual rays but transparent, at least on one side, to X-rays. Such cases are called cassettes. In making radiographs, it is desirable to shorten the length of the exposure as much as possible in order effectively to "stop" the movement of the body sections being radiographed and to reduce to a minimum the amount of radiation received by the patient. In order to serve these two ends, it is customary to equip cassettes with one or more intensifying screens which are placed in contact with the film. Such screens produce fluorescent light the intensity of which varies roughly in accordance with the intensity of the X-rays falling upon them; and the film consequently receives actinic rays from the intensifying screen, or screens, as well as from the X-rays themselves. In order to prevent the fluorescent light from reaching any portion of the film excepting that portion immediately adjacent thereto, it is important that the intensifying screen or screens be in intimate contact with the film. It is one of the objects of the present invention to provide simpler and more effective means for producing and maintaining such contact.

Another object of the present invention is to afford a very simple construction that will produce not only the required intimate contact between the film and the cassettes but which will also assure protection of the film against visual rays.

An additional object is the provision of means to make it unnecessary to "dig" the film out of the tray portion of the cassette when removing it or to "rumple" or buckle the film during such removal. Such digging or rumpling often entails contact between the fingers and the intensifying screen, and this ultimately results in an oval area on the screen where the intensity of the fluorescence is lessened. This produces a corresponding oval spot on the film.

Another object of the present invention is the provision of simple locks between the lid and the tray—locks that may be readily fastened or released in the dark.

Still another object is the provision of simple hinges for the lid, the hinges having such construction that they will assist in producing the desired contact between the intensifying screens and the film.

Other objects will appear as the specification proceeds.

In the drawings:

FIG. 1 is a rear view of a cassette embodying one species of my invention and showing the edges of the tray, the lid, the hinge, and the lock.

FIG. 2 is a section taken on line 2—2 or 2a—2a of FIG. 1.

FIG. 3 is a front view of the cassette of FIGS. 1 and 2, showing the construction of the corners.

FIG. 4 is a section taken on line 4—4 of FIG. 1.

FIG. 5 is a perspective view of one form of my cassette, showing the back or lid open and the film lifted from the tray portion of the cassette through the instrumentality of vacuum cups on the lower portion of the back cover.

FIG. 6 is a side view of another form of my cassette in which the vacuum cups are placed near the free edge of the lid. In this view, the film has been raised from the tray portion of the cassette through the action of the vacuum cups from which the film is here shown hanging by force of gravity.

FIG. 7 is a fragmentary view, partly in section and partly broken away, showing the action of one of the vacuum cups.

FIG. 8 is a similar veiw, showing the operation of the locks.

FIG. 9 is a plan view of the tray portion of one form of my cassette with the lid removed.

FIG. 10 is a view of the upper portion of the underside of the lid of my cassette, showing the position of the vacuum cups.

Figure 26:
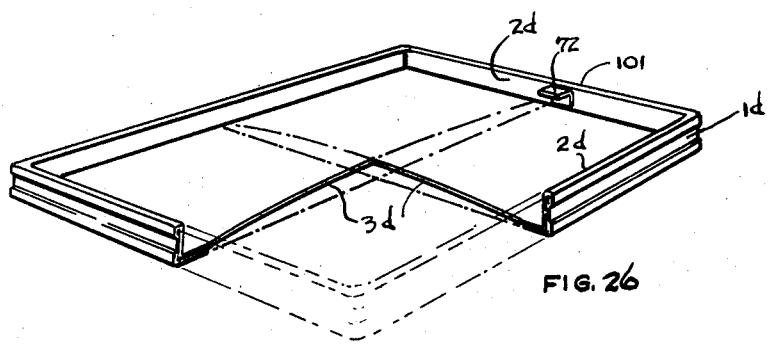

FIG. 26, which is partly in section, shows the internal curve or cupping of the front or base of my cassette.

FIGS. 27A, B, C and D illustrate another form of latch for assuring good closure of the lid or cover around the edges.

Figure 28:
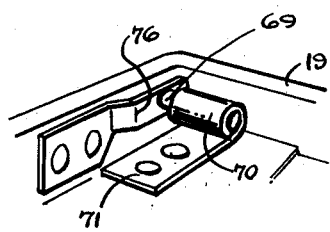

FIG. 28 illustrates a modified hinge structure for the lid or cover.

FIGS. 29, 30 and 31, each showing different positions of the components, illustrate another embodiment of the latching principle illustrated in FIGS. 27A, B, C and D.

FIGS. 32 to 36, inclusive, show details of the structure pictured in FIGS. 29, 30 and 31.

The tray portion of one embodiment of my cassette comprises a frame 1, an inside strip 2 that extends all the way around the inner surface of the frame, and an X-ray-transparent base on front 3. The frame 1 is formed of channel stock having a cross section somewhat as shown in FIG. 2. In this view, it will be observed that the channel comprises not only an intermediate flat section, but an upper flange or bead 4 formed substantially at right angles to the main portion of the channel, and that it also comprises a lower flanged portion 5 which forms an angle of less than 90° with the side portion. The channel stock is bent into a rectangular frame 6, substantially as shown in FIGS. 1, 3 and 8, the two ends of the channel stock coming together at a point 7. The flange of the channel is cut away at the corners on the underside, as indicated in FIG. 3, to facilitate the forming of the frame.

The base or front 3 lies inside the rectangular frame against the lower flange 5, which of course extends all the way around the frame, although the corners of this flange are notched. The strip 2 also extends all the way around the frame, lying on the inside thereof, and is effectively wedged between the edges of the base 3 and the upper flange 4 of the main frame. The edge of the strip 2 lying against the base 3 forces the outer edges of the base firmly into the corners provided by the main side portion 1 of the frame and the inwardly turned lower flange 5. When the outer edges of the base are thus held in position by the strip 2, the acute angle of the flange 5 causes the base to cup inwardly. In the actual construction of this cassette, the extent to which the base is cupped is considerably less than that indicated in FIG. 2, the degree of the cupping being exaggerated solely for purposes of illustration. In an 8" x 10" cassette, the actual cupping is between 1/16 and 1/8 of an inch at the center.

The inner strip 2 is riveted to the channel stock forming the frame by a series of rivets 9, two of which, designated by the reference characters 9a and 9b, are placed near the point of junction 7 of the two ends of the channel stock forming the outer frame. The two ends of the inner strip come together at the end of the cassette opposite the end at which the two ends of the frame come together, and rivets 9c and 9d are placed closely adjoining the juncture of the two ends of the inner strip as shown in FIG. 9.

A generally rectangular frame 10, preferably formed of sponge rubber or other resilient material, nests in the frame against the inner strip 3, as shown in FIGS. 2 and 9. This resilient border is cemented in place or affixed by any other convenient means.

When two intensifying screens are used, one such screen 11 is suitably attached to the inner surface of the panel 3 as indicated in FIGS. 2 and 9.

The lid portion of the cassette 12 is curved somewhat as shown in FIGS. 5 and 6, the degree of curvature being exaggerated in the latter figure for purposes of illustration. The lid 12 is also cupped in a crosswise direction so that the lid as a whole, when viewed from the top, is slightly concave.

Figure 11:
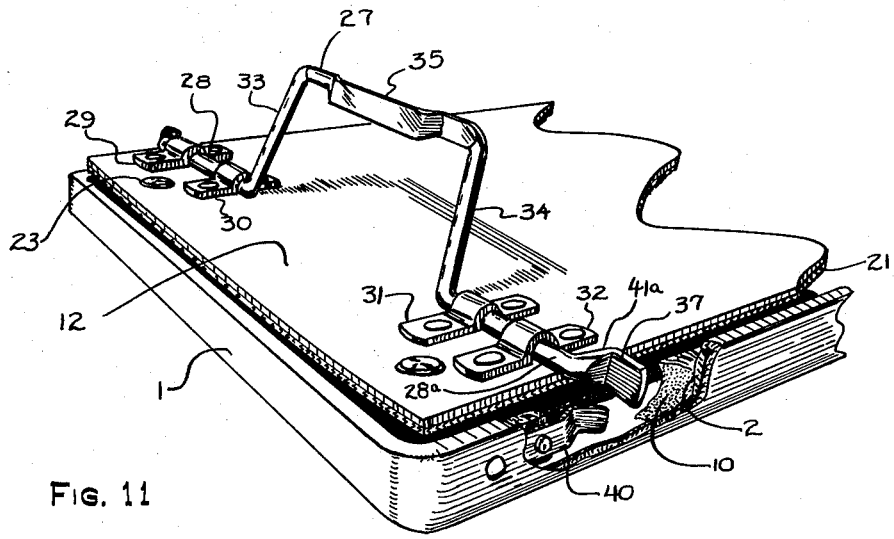
FIG. 11 is a perspective view of one end of the cassette illustrated in FIG. 6, showing the locking handle and one of the brackets or strikes with which it cooperates.

The hinge for the lid comprises a bent rod or tubular member 13 with suitable supports 14, 15 and 16, FIG. 1, and two brackets 17 and 18, appropriately attached, as by rivets, to opposite walls of the tray, these brackets having apertures near their free ends to receive respectively opposite ends of member 13 as indicated in FIGS. 1 and 6. It will be observed in FIG. 6 that there is a space 19 between the lid 12 and the adjacent portion of the rod 13. This fact, together with the attachment of member 13 to the lid by brackets 14, 15 and 16, causes the end portion 20 of the lid to exert downward pressure against the tray when the lid is closed, as shown in FIG. 1. A layer of felt 21, FIGS. 6, 10 and 11, is attached by any suitable means to the inner side of the lid, and an intensifying screen 22 is attached to this layer of felt. If it is desired to protect the film from scattered radiation from the lid or cover, a thin sheet of lead is interposed between the screen 22 and the lid 12. This has not been shown in the figures because such use of lead to absorb secondary radiation forms no part of this invention per se.

As set forth in the objects, my invention embodies means to lift the film from the tray portion of the cassette when the film is being removed in the dark room after it has been exposed to the X-rays. For this purpose, I use vacuum cups 23a and 23b, which may be placed on the inner side of the lid near the hinged end as indicated in FIG. 5, where they show through the transparent film 24. In the preferred form of my invention, however, I put the vacuum cups on the inside of the free end of the lid, as shown in FIG. 6. To provide room for such vacuum cups, I notch the adjacent portion of the intensifying screen 22 as indicated at positions 25 and 26 in FIG. 10.

The locking means for holding the lid in closed position and in firm contact with the tray is shown in FIGS. 1, 4, 8 and 11. This lock comprises a shaped member or handle 27 preferably formed from a hollow tube. Opposite end portions 28 and 28a are rotatably supported on the cover 12 by means of brackets 29, 30, 31 and 32. The central portion of the handle member 27 is displaced from the aligned portions 28 and 28a, as shown in FIGS. 1 and 11. This results in a handle having two end portions 28 and 28a in axial alignment and adjacent portions 33 and 34 which are respectively at right angles to portions 28 and 28a, but parallel to each other. Portions 33 and 34 are integral with the aforementioned central displaced portion which is parallel with the end portions 28 and 28a. When the handle is formed of tubular stock, its central portion is flattened intermediate its junctures with portions 33 and 34, as shown at 35, FIGS. 1, 4 and 11. The flat portion 35 is displaced from the main plane of the handle, as these figures clearly show. Such displacement makes it easier to engage the handle with the tips of the bare or gloved fingers.

The continuations of portions 28 and 28a of the handle that extend beyond brackets 29 and 32 respectively are bent as indicated in FIGS. 8 and 11 to form short sections 41 and 41a. These short sections 41 and 41a extend not only at angles to portions 28 and 28a, but also to portions 33 and 34, the last expressed angular relationship being shown in FIG. 8 where section 34 is vertically disposed in the full line view. The extreme outer ends of portions 41 and 41a are flattened and turned outwardly, as indicated in FIGS. 8 and 11.

When the lid is closed and held down at its free end by one's fingers, the handle is turned clockwise from the position shown in continuous lines in FIG. 8 to the position shown in dotted lines. During this angular movement, the tip 37 moves from the position shown in continuous lines to the position shown in broken lines. This movement requires that the tip pass under the end 42 of bracket 40. The curved end 42 meanwhile acts as a cam around which the tip 37 moves. A tip 36 on the extreme other end of the handle operates in the same way with respect to bracket 39. There are thus two cam locks on my device, each serving to hold down an opposite side of the lid near the free end thereof. It has already been mentioned that my lid is curved in two directions, FIG. 2 being a cross section taken either on line 2—2 or line 2a—2a of FIG. 1. The central portion of the free end of the lid is of course the first portion of the free end of the lid to make contact with the film as the lid is closed, and it will be clear that the pressure obtained by the two cam locks on opposite sides of the cassette will produce continuous contact all the way across the free end of the lid. The fact that the lid is normally curved in a longitudinal direction as well as crosswise thereto, assures firm uniform pressure longitudinally when the pressure is applied at the opposite transverse positions of the cam locks. Intimate contact with the screens is consequently secured over the entire surface of the film.

Reference has already been made to the vacuum cups which I employ to lift the film from the bottom of the tray portion of my cassette. In FIG. 9, the film 24 is shown in the bottom of the tray. In this view, the lid has been removed entirely to reveal structural features of the tray.

When the lid is properly hinged to brackets 17 and 18 and the lid is locked firmly down by means of the handle hereinbefore described, the edges of the corner vacuum cups are not only in engagement with the film, but the cups are somewhat compressed as shown in FIG. 7. If the vacuum cups are positioned near the outer corners of the lid, they will lift the film in the manner indicated in FIG. 6, when the cover is raised. The film is here shown hanging down from the two vacuum cups which in this view are disposed above the tray. Vacuum cup 23c of course does not show in FIG. 6, as it is directly behind cup 23d. Inasmuch as the film now hangs vertically, it is possible to grasp it at the lower end and thus readily remove it from the cassette without rumpling it or buckling it, and must be done when conventional cassette are used.

If the vacuum cups are placed near the hinged corners of the lid, the raising of the lid will cause the film to assume a position somewhat like that shown in FIG. 5, where the film is illustrated as falling away from the cover. The film is as easily grasped in this position as in the position shown in FIG. 6—in fact, some technicians prefer this arrangement.

As is well known, the raising of the cover of the conventional cassette leaves the film resting on the lower intensifying screen in the bottom of the tray, and it has been mentioned previously in this specification that its removal usually requires that the technician dig slightly under the edge of the film in order to raise it or that he rumple or buckle it to lift it from the tray. This frequently results in contact between the fingers and the intensifying screen, and after a period of time the repeated contacts between the fingers and the screen either leaves a deposit of film on the screen or removes a small portion of the fluorescent salts. An oval spot ultimately develops on the screen and even affects the radiographs, as the diminution in fluorescence where the spot occurs produces a correspondingly dim spot on the film. Such imperfections are of course undesirable and are eliminated by the use of the vacuum cup arrangement described herein.

Figure 12:
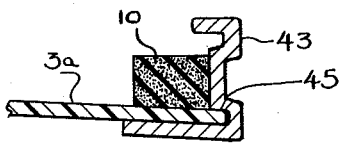
FIG. 12 shows a cross-section through one side of a modified form of my cassette, the modification here illustrated being in the configuration of the molding from which the frame is constructed.

FIG. 12 is a cross-section at any point along the edge of a modified form of my cassette. When this construction is used, the frame is shaped from rolled, milled or extruded stock 43, having a cross-section substantially as shown. It will be noted that strip 2, which holds the X-ray-transparent panel 3 in position in the construction illustrated in FIGS. 7 and 8, is omitted when the frame has the cross-section indicated in FIG. 12. In this construction, the molding is of such configuration that the panel 3a fits in recess 45 in the molding, thus making the side strip 2 of the previously described embodiment unnecessary. The rubber nest 10 is of course employed in the same manner as in the previously described construction.

Figure 13:
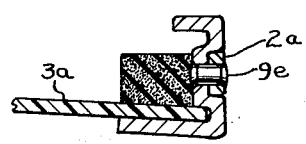
FIG. 13 illustrates the use of an external cleat for joining the two ends of a frame such as that shown in cross-section in FIG. 12.

In the embodiment illustrated in the previously discussed figures, the strip 2 not only holds the back panel 3 in place but serves the additional purpose of a backing for the outer frame where the two ends come together at point 7, FIG. 9, rivets 9a and 9b being placed through the frame 1 and strip 2 near this juncture. When the strip 2 is omitted, as in the frame construction illustrated in FIG. 12, an external strip 2a, FIG. 13, is employed. This strip is disposed in the external recess in the molding material, and suitable rivets, such as 9e, are placed through the frame and piece 2a, which in this construction serves somewhat the purpose of a cleat.

Figure 14:
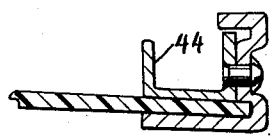
FIG. 14 illustrates the substitution of a metal channel for the rubber frame or nest shown in certain other figures.

FIG. 14 illustrates still another modification in the structure of my tray, in which the nest for the film is a channel 44.

Figure 15:
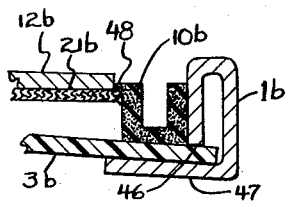
FIGS. 15 and 16 illustrate still another modification of my frame and also show a variation in the cross-sectional configuration of the rubber nest which may be optionally used with any form of cassette frame construction.
Figure 16:
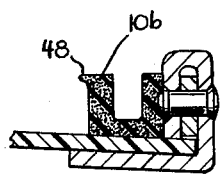

FIGS. 15 and 16 illustrate another tray construction in which the frame 1b is formed of molding material having still another configuration. The inner end 46 is spaced from the outer flange 47 by a distance slightly greater than the thickness of the panel 3b. The space between end 46 and flange 47 serves the same purpose as the recess 45 in the construction shown in FIG. 12.

In any embodiment of my invention, I contemplate the alternate use of a rubber nest whose walls have somewhat the configuration indicated in FIG. 15, the rubber, or other resilient material, in this view being designated by the reference characters 10b. The chief difference between this configuration of the walls of the nest, lies in the provision of a lip 48 which springs into the position indicated in FIG. 15 when the cover 12b is locked firmly in place. It will be noted that the lip overhangs, or produces an interference fit with, the felt layer 21b when the lid is closed, thus giving added protection against the introduction of light. When the cover is open, the felt layer 21b is of course on the outside of lip 48; and as the lid closes, the lip usually depresses and compresses until it finally flexes up over the felt layer 21b, due to the release of the energy stored in the rubber during its initial compression. Should the fit of the parts and the degree of elasticity of the rubber be such that this flexing does not occur, the interference of the rubber and felt is alone sufficient to assure a light-tight seal.

Figure 17:
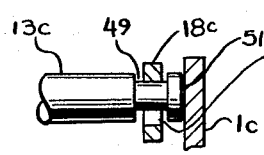
FIGS. 17 and 18 illustrate a means for assuring that the shaft of the hinge will not be dislodged from the cooperating members in which it is journaled.
Figure 18:
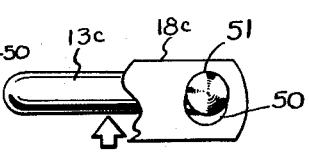

FIGS. 17 and 18 illustrate a modified construction of the external ends of the hinge and the brackets in which these ends are journaled. Each end of the hinge 13c is provided with an annular groove 49, having a length greater than the thickness of the bracket 18c. The bracket is provided with a circular hole 50 as in the construction illustrated in FIG. 6, this hole being sufficiently large to pass the extreme end 51 of the shaft, the diameter of which is the same as that of the main portion of the hinge shaft 13c. The portions 52 and 53 of the hinge, indicated in FIG. 1, together with the extreme ends 54 and 55 of the hinge shaft, are so formed that the total length of the hinge from the tip of one end portion 54 to the tip of the opposite end portions 55 is slightly greater than the distance from the outside of the portion of bracket 17 that immediately adjoins portion 54 of the hinge and the corresponding external portion of bracket 18 that immediately adjoins the hole through which end 55 passes. In order to place the ends 54 and 55 initially in the apertures in members 17 and 18, the portions 52 and 53 of the hinge are sprung inwardly in order to reduce temporarily the overall length of the hinge at the extreme ends. These ends are then inserted through the holes that are adapted to receive them in brackets 17 and 18, and they are then allowed to spring outwardly into position. When the construction illustrated in FIGS. 17 and 18 is employed, the resilience of the hinge normally holds the extreme ends 51 of the hinge shaft on the outside of the brackets. A portion of one of these brackets, 18c, appears in these two figures. It was explained in the original description of the hinge that its configuration is such that it acts as a spring which applies pressure at brackets 14 and 16. This same spring pressure acts in the direction of the arrow shown in FIG. 18 and forces the portion 13c of the hinge shaft upwardly so that the tip 51 is latched on the outside of bracket 18c. The inner shoulder of tip 51 then acts as an abutment against the adjacent portion of the bracket 18c. When the cover is open and there is no angular pressure on the hinge, the shoulders on the sides of grooves 49 cannot be relied upon to keep the hinge shaft from moving longitudinally. In this case, longitudinal movement of the entire hinge shaft is prevented by the engagement of end 51 and the corresponding opposite end with the side walls 1c.

Figure 19:
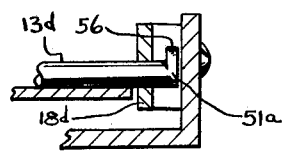
FIGS. 19 and 20 illustrate still another construction to insure against the dislodgment of the hinge shaft from the mounting brackets.
Figure 20:
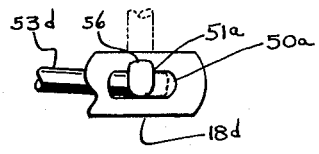

FIGS. 19 and 20 illustrate still another alteration in the ends of the hinge and in the associated brackets. In this embodiment, the aperture 50a that receives the tip 51a of the hinge is elongated as shown in FIG. 20. When portion 53a of the hinge is oriented to the open position indicated in broken lines in FIG. 20, the tip 51a also assumes the position indicated in broken lines. The long sides of end 51a then lie parallel to the edges of the slot 50a. However, the ends of the hinge do not come out of the slot, as they are retained therein by the resilience of the spring, as previously described in connection with the embodiment shown in FIG. 1. But when the lid is closed, the hinge lies generally parallel to the cover and to the longitudinal axis of the bracket 18d, and the tip 56 of end 51a then overlies the bracket 18d, the inner shoulder of the tip 56 then acting to constrain the handle or shaft 13d against such extreme longitudinal movement as might dislodge the outer ends of the hinge from the holes in which they are journaled in the mounting brackets.

Figure 21:
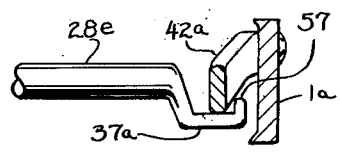
FIG. 21 illustrates another form of cassette lock wherein provision is made for limiting the amount of relative movement between the shaft of the lock and the cooperating strike.

FIG. 21 illustrates a construction, similar to that shown in FIGS. 19 and 20, for assuring that the tip 37a of the locking member will not be dislodged from under bracket 42a due to a sudden jar that might move the portion 28e of the locking handle away from the bracket 42a. To prevent such dislodgment, the tip 37a is turned back at the end in a radial direction toward the axis of the portion 28e of the locking handle to form an abutting hook 37.

Figure 22:
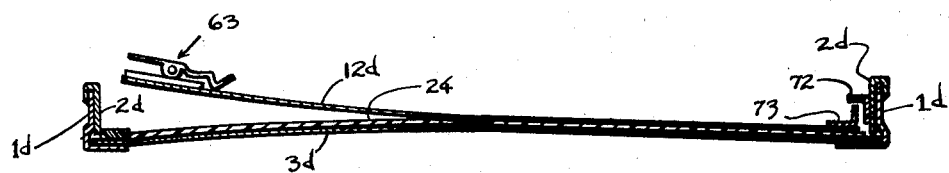
FIG. 22 illustrates the cooperative action between the front or base portion of one form of my cassette tray with the associated front or lid.
Figure 23:
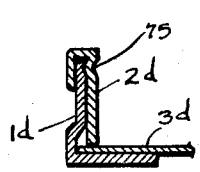
FIG. 23 illustrates a modified frame structure in which the base is held in position by a cleat that interlocks with the main frame member.
Figure 24:
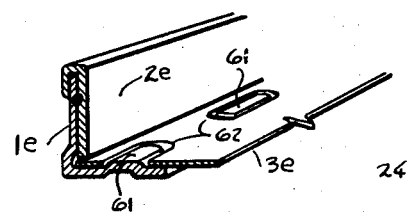
FIG. 24 illustrates still another interlocking construction for the base and frame.

The figures that have hereinbefore been described in detail have not shown both the cupped base and the cupped lid in the same figure, nor have they illustrated the specific cooperation between the center of the lid at the hinged end and the adjoining portion of the front or base of the cassette. In FIG. 22 it wil be seen that the front or base portion 3d and the cover 12d are curved or cupped in opposite directions. The curvature of the base, both longitudinally and laterally, may be seen in FIG. 26.

Figure 25:
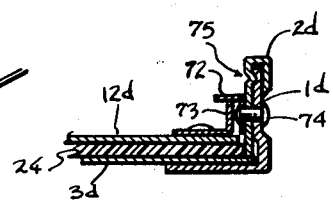
FIG. 25 shows a structure that assures close contact between the center portion of the cover at the hinged end and the adjoining part of the base.

In FIGS. 22 and 25, it will be noted that an inverted L-shaped bracket 72 is riveted or otherwise appropriately attached to the frame. The bracket 72, as will be seen in FIG. 26, is attached to the inside of the frame 2d–1d midway between the two sides where it serves, in connection with two rivets 74, to hold the two ends of the frame together, as well as to form an upper limiting abutment for bracket 73 which is riveted or otherwise appropriately attached to the adjacent portion of the lid or cover. When a film is interposed between the front and back of the cassette, the resilience of these members keeps the intensifying screens that are normally attached to them in firm contact with the film. As the closing of the lid begins, the upward extending portion of bracket 73, wedging under bracket 72, keeps the rear central portion of the film in close contact with such screens as may be adjacent thereto; and as the lid closes, the rolling action continues to extend the firm contact, which is ultimately retained by the latch 63. A plurality of these latches may be used around the edge of the cassette.

The rear corners of the cassette may of course be held down by such means as those illustrated in FIGS. 1, 9, 18, 19 and 20, or by hinges such as those illustrated in FIG. 28. Bracket 71, riveted or otherwise suitably attached to the rear corner of the lid, is rolled tightly around the rod 69, which is journaled in an aperture formed in the resilient member 76 attached to the side of the cassette near its junction with the back portion 1g.

Figure 27:
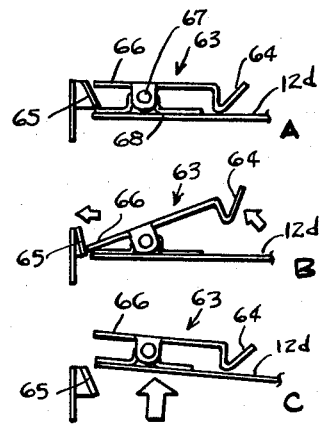

FIGS. 27A, B, C and D illustrate the action of the latch 63. When the latching structure is closed, a resilient strike 65 rests over the bracket 68 on which the latch-operating member 63 is pivoted at 67. The closed condition of these members is indicated at both A and B in FIG. 27. If the operator's finger is placed beneath the finger-catch 64 of the latching means and then pressed upward in order to move the pivoted member 63 in a counterclockwise direction, the forward end 66 presses against the resilient strike 65, causing the strike to move away from the pivot bracket 68, as shown in FIG. 27B, thus causing the cover, due to its own resilience, to flip upward as indicated at C in FIG. 27.

Another embodiment of this locking principle is shown in FIGS. 29, 30 and 31 in connection with FIGS. 32 to 36.

In this form of lock, a spacing plate 77 is attached to the forward end of the closure member 12f. A pair of levers 78 and 79 are pivoted to plate 77 and to closure 12f by means of the rivets or pivoting members 80 and 81 which also extend through a cover plate 95. This plate may conveniently be approximately the size of the spacing plate 77 over which it is superimposed with the levers 78 and 79 interposed between them. The pivot elements 80 and 81 of course extend through member 95, then individually through the levers, then through the spacing plate 77 and optionally also through the closure member 12f.

Lever 78 has a protruding narrowed end 102 adapted to slip under the bracket 94, FIGS. 31 and 35. Bracket 94 is riveted or otherwise appropriately attached to the frame member 1f.

Lever 79 has a narrowed or reduced end 103 which cooperates with another overhanging bracket 94 in the manner already described in connection with the operation of lever 78.

Levers 78 and 79 are provided with apertures 83 and 85 respectively. These apertures surround rivet heads or other appropriate members 82 and 84 which are considerably smaller in diameter respectively than the apertures 83 and 85. These rivet heads and the holes which surround them serve as limiting stops for the movement of the lever as will be clear from FIGS. 29 to 31 inclusive.

The inner ends of levers 78 and 79 are provided with arcuate recesses 89 and 90 respectively to receive the opposite arcuate lobes 86 and 87 of the floating latching element 88. Element 88 is movably constrained between these levers and between the spacing plate 77 and the upper cover plate 95. Two spaced upwardly extending lugs 92 and 93 are formed on the spacing member 77 so that the tongue 66f of member 88 may extend between them.

The resilient member 65f shown in FIGS. 29 to 34 inclusive is appropriately attached to the front portion of the frame 1f. When the back cover or lid 12f is closed, member 65f overhangs the cover 12f as indicated in FIGS. 29 and 32. When the front central portion of the cover 12f is thus maintained in a tightly closed position, the narrowed ends 102 and 103 of levers 78 and 79 respectively hold down the sides of the cover because these ends are then retained under the strikes 94 as indicated in FIGS. 29, 31 and 35.

The construction and operation of this double-lever latching arrangement is such that it cannot easily be inadvertently released. Both of the levers must be pressed upward simultaneously. I provide shallow recesses 99 near the ends of each of these levers to receive a fingertip so that the two levers may be pressed and moved simultaneously in the direction indicated by the arrows thereupon. As the outer ends of levers 78 and 79 move together to the positions indicated in FIG. 30, the inner ends of these levers move the floating member 88 downward causing the tongue 66f to extend between the lugs 92 and 93 and press against the resilient member 65f, thus pressing this member away from the front edge of the closure member 12f. This portion of the closure member is thus released at the same time that the reduced ends 102 and 103 of the levers move from under the strikes 94.

FIG. 33 shows the tongue 66f in cross section pressing against the resilient strike 65f as shown in the plan view of FIG. 30.

Should lever 78 alone be pressed upward—that is, moved in a counterclockwise direction—the arcuate inner end of this lever would move the floating latch 88 to the position shown in FIG. 31. As member 88 rotates to this position, its tongue 66f engages lug 93 thus preventing the tongue from coming into engagement with the resilient strike 65f. On the other hand, if lever 79, instead of lever 78, had been pushed upward, the floating latch member 88 would have been rotated in the opposite direction so that the downward movement of tongue 66f would have been prevented by lug 92. It will thus be seen that neither of the levers operating alone can effect the engagement of tongue 66f with the latch 65f.

It will be noted in FIG. 31 that lever 78 is approximately midway between its two extreme angular positions with the limiting rivet member 82 concentrically disposed within the cooperating aperture 83 in lever 78. When lever 78 is in this intermediate position, it will be noted that its reduced outer end 102 is still retained beneath the strike 94. There has thus been no release of the cover either at the edge nor at the center. It is only when both levers are moved simultaneously to the position indicated in FIG. 30, that the tongue 66f can effect the release of the resilient strike 65f as well as the release of the lever ends 102 and 103 from the strikes 94 that normally overhang them.

Various modifications may be made in the specific structure of my cassette as hereinbefore described, and any element in any of the appended claims may be omitted and replaced by another component performing the same function without departing from the broad spirit of my invention as succinctly set forth in the said claims.

My claims are:

1. A cassette comprising a generally rectangular tray for receiving an X-ray film; an intensifying screen on the inner surface of said tray; a resilient metal cover for said tray, said cover arched toward said tray in two directions substantially at right angles to each other; means for hinging said cover to said tray, said means being pivoted to said cover near adjoining corners thereof; and a plurality of releasable cam locks for urging the remaining corners of said cover toward the inner surface of said tray and for holding the cover in closed position against the resilient action thereof.

2. A cassette comprising a generally rectangular tray for receiving an X-ray film; a cover for said tray; means for hinging said cover to said tray, said means being pivoted to said cover near one edge thereof; means for holding said cover in closed position and for pressing the corner portions of the opposite edge of said cover toward the inner surface of said tray; and vacuum cups on the inner surface of said cover near at least two corners thereof, the concave portions of said cups facing the inner surface of the tray in order to adhere to such film as may be interposed between the inner surface of said tray and the inner surface of said cover.

3. A cassette comprising a generally rectangular tray for receiving an X-ray film; an intensifying screen on the inner surface of said tray; a cover for said tray; means for hinging said cover to said tray, said means being pivoted to said cover near one edge thereof; means for holding said cover in closed position and for pressing the corner portions of the opposite edge of said cover toward the inner surface of said tray; and vacuum cups on the inner surface of said cover near at least two corners thereof, the concave portions of said cups facing the inner surface of the tray in order to adhere to such film as may be interposed between the inner surface of said cover and said intensifying screen.

4. A cassette comprising a generally rectangular tray for receiving an X-ray film; a first intensifying screen on the inner surface of said tray; a resilient metal cover for said tray, said cover arched toward said tray in two directions substantially at right angles to each other; a second intensifying screen interposed between said first screen and said cover and carried at least indirectly by the cover; means for hinging said cover to said tray, said means being pivoted to said cover near adjoining corners thereof; and a plurality of releasable cam locks for urging the remaining corners of said cover toward the inner surface of said tray and for holding the cover in closed position against the resilient action thereof.

5. A cassette comprising a generally rectangular tray for receiving an X-ray film, the bottom of said tray being arched inwardly in two directions substantially at right angles to each other; an intensifying screen on the inner surface of said tray; a resilient metal cover for said tray, said cover arched toward said tray in two directions substantially at right angles to each other; means for hinging said cover to said tray, said means being pivoted to said cover near adjoining corners thereof; and a plurality of releasable cam locks for urging the remaining corners of said cover toward the inner surface of said tray and for holding the cover in closed position against the resilient action thereof.

6. A cassette comprising a generally rectangular tray for receiving an X-ray film; an intensifying screen on the inner surface of said tray; a resilient metal cover for said tray, said cover arched toward said tray in two directions substantially at right angles to each other; means for hinging said cover to said tray, said means being pivoted to said cover near adjoining corners thereof comprising a spring for urging toward said inner surface the portions of the cover lying between said corners; a plurality of releasable cam locks for urging the remaining corners of said cover toward the inner surface of said tray and for holding the cover in closed position against the resilient action thereof.

7. A cassette comprising a generally rectangular tray for receiving an X-ray film; an intensifying screen on the inner surface of said tray; a resilient metal cover for said tray, said cover arched toward said tray in two directions substantially at right angles to each other; a sheet of non-metallic resilient material interposed between said screen and the inner surface of said cover and carried at least indirectly by the latter; means for hinging said cover to said tray, said means being pivoted to said cover near adjoining corners thereof; and a plurality of releasable cam locks for urging the remaining corners of said covers toward the inner surface of said tray and for holding the cover in closed position against the resilient action of said cover and said sheet of non-metallic material; the resilience of said cover and said sheet acting to hold the sheet in firm engagement with such X-ray film as may be interposed between said sheet and said screen.

8. A cassette comprising a generally rectangular tray for receiving an X-ray film; a first intensifying screen on the inner surface of said tray; a resilient metal cover for said tray, said cover arched toward said tray in two directions substantially at right angles to each other; a sheet of non-metallic resilient material interposed between said first screen and the inner surface of said cover and carried at least indirectly by the latter; a second intensifying screen interposed between said first screen and said sheet and attached to the latter; means for hinging said cover to said tray, said means being pivoted to said cover near adjoining corners thereof; and a plurality of releasable cam locks for urging the remaining corners of said cover toward the inner surface of said tray and for holding the cover in closed position against the resilient action of said cover and said sheet of non-metallic material; the resilience of said cover and said sheet acting to hold said screens in firm engagement with such X-ray as may be interposed between them.

9. A cassette comprising a generally rectangular tray for receiving an X-ray film; an intensifying screen on the inner surface of said tray; a resilient metal cover for said tray, said cover arched toward said tray in two directions substantially at right angles to each other; means for hinging said cover to said tray, said means comprising an elongated resilient member pivoted at its ends on the side walls of said tray near one end thereof and hinged to said cover near opposite sides of the cover in at least two locations substantially equally spaced from said one end of said tray but more remote therefrom than the positions at which the ends of said member are pivoted, said member also hinged to said cover at a third location intermediate the first mentioned locations, but closer to said one end of said tray than are said first mentioned locations.

10. A cassette comprising: a peripheral frame having side walls and flanges each extending inwardly from the bottom of the adjacent wall and forming an angle of less than ninety degrees (90°) therewith; a sheet of resilient, X-ray transparent material resting on said flanges; means on said side walls for forcing said sheet into firm engagement with the portions of said flanges that immediately adjoin said walls; said flanges acting, because of their recited angular relationship with said walls, to arch said sheet inwardly in two directions substantially at right angles to each other; a resilient cover for said tray, the surface of said cover that faces said sheet when the cover is closed having a non-concave formation when the cover is open; and means for releasably forcing the marginal portions of said cover toward the corresponding portions of said sheet.

11. A cassette comprising: a rectangular frame having four side walls and with individual flanges each extending inwardly from the adjacent wall and forming an angle of less than ninety (90°) degrees therewith; a sheet of resilient, X-ray transparent material resting on said flanges; means on said side walls for forcing said sheet into firm engagement with the portions of said flanges that immediately adjoin said walls, said means comprising a strip adjoining the inner surface of said walls, the lower edge of said strip pressing against said sheet; said flanges acting, because of their recited angular relationship with said walls, to impart a convex formation to the inside surface of said sheet; a resilient cover for said tray, the surface of said cover that faces said sheet when the cover is closed having a nonconcave formation when the cover is open; and means for releasably forcing the marginal portions of said cover toward the corresponding portions of said sheet.

12. A cassette comprising: a rectangular frame having four side walls and with individual flanges each extending inwardly from the adjacent wall and forming an angle of less than ninety (90°) degrees therewith; a sheet of resilient, X-ray transparent material resting on said flanges; means on said side walls for forcing said sheet into firm engagement with the portions of said flanges that immediately adjoin said walls, said means comprising a groove for receiving the edges of said sheet, said groove bounded by the adjacent flange and an inwardly extending portion of the adjacent wall; said flanges acting, because of their recited angular relationship with said walls, to impart a convex formation to the inside surface of said sheet; a resilient cover for said tray, the surface of said cover that faces said sheet when the cover is closed having a non-concave formation when the cover is open; and means for releasably forcing the marginal portions of said cover toward the corresponding portions of said sheet.

13. A cassette comprising: a rectangular frame having four side walls and with individual flanges each extending inwardly from the adjacent wall and forming an angle of less than ninety (90°) degrees therewith; a sheet of resilient, X-ray transparent material resting on said flanges; means on said side walls for forcing said sheet into firm engagement with the portions of said flanges that immediately adjoin said walls, said means comprising a portion of said frame integral with said side walls and extending inward from the upper part of said walls and then downward against said sheet; said flanges acting, because of their recited angular relationship with said walls, to impart a convex formation to the inside surface of said sheet; a resilient cover for said tray, the surface of said cover that faces said sheet when the cover is closed having a non-concave formation when the cover is open; and means for releasably forcing the marginal portions of said cover toward the corresponding portions of said sheet.

References Cited in the file of this patent

UNITED STATES PATENTS

| | | |
|---|---|---|
| 1,897,621 | Reuter | Feb. 14, 1933 |
| 2,193,021 | Dietz | Mar. 12, 1940 |
| 2,494,740 | Boucher | Jan. 17, 1950 |
| 2,878,389 | Raffman | Mar. 17, 1959 |
| 2,925,766 | Sandgren | Feb. 23, 1960 |

FOREIGN PATENTS

| | | |
|---|---|---|
| 414,222 | Germany | June 2, 1925 |
| 432,649 | Great Britain | July 31, 1935 |